J. T. NELSON.
HOSE COUPLING.
APPLICATION FILED MAY 22, 1918.
1,303,367.
Patented May 13, 1919.
2 SHEETS—SHEET 2.
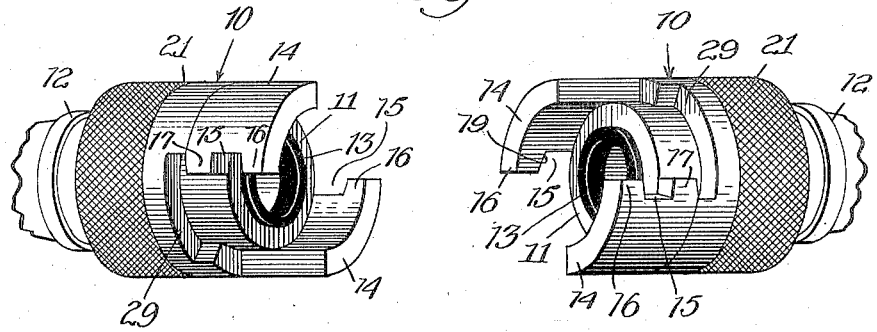
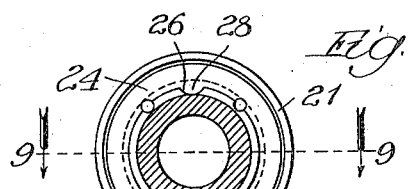
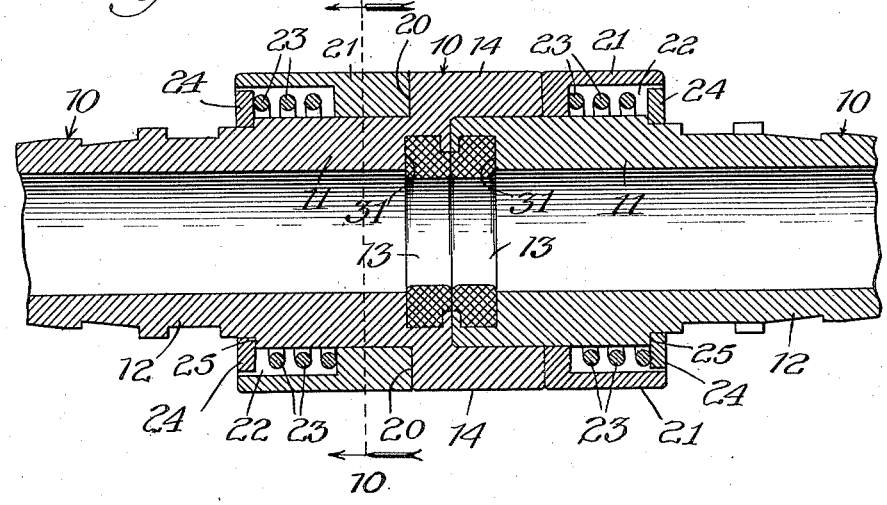
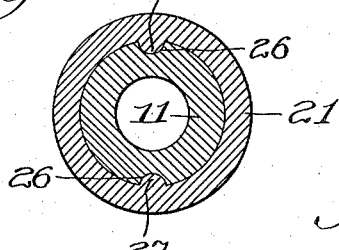
Witnesses:
Inventor:
John T. Nelson,
By Robert Wann
Attys.

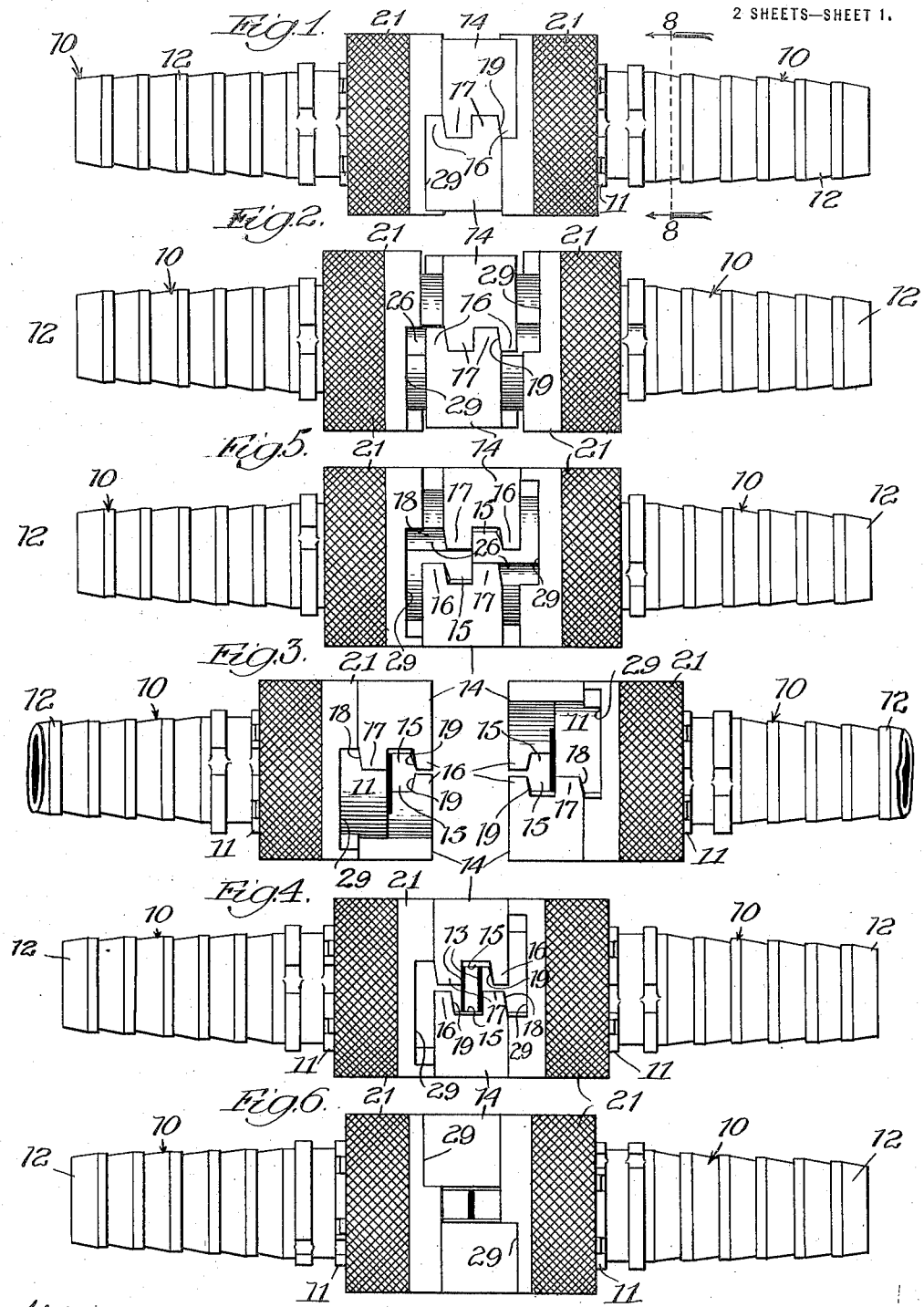

UNITED STATES PATENT OFFICE.

JOHN T. NELSON, OF AURORA, ILLINOIS, ASSIGNOR TO INDEPENDENT PNEUMATIC TOOL COMPANY, OF CHICAGO, ILLINOIS, A CORPORATION OF DELAWARE.

HOSE-COUPLING.

1,303,367.     Specification of Letters Patent.     Patented May 13, 1919.

Application filed May 22, 1918. Serial No. 235,931.

*To all whom it may concern:*

Be it known that I, JOHN T. NELSON, a citizen of the United States, residing at Aurora, in the county of Kane and State of Illinois, have invented new and useful Improvements in Hose-Couplings, of which the following is a specification.

This invention relates to hose and like couplings.

Among the objects of my invention is to improve the construction of couplings of the kind referred to, in the several particulars as will hereinafter more fully appear, and to provide in particular a coupling comprising two coöperating coupling members made exactly alike so as to avoid the necessity of being required to use right and left or male and female members for each complete coupling, and thereby produce a universal one. A further object of my invention is to provide a coupling of such a construction that the two parts or members thereof may be readily and quickly locked and unlocked, with both of such actions taking effect in a somewhat automatic manner, and when locked the coupling members are securely held against being accidentally moved or jarred apart. A further object of my invention is to so construct the locking means that, in case one of the locking parts thereof is moved into its unlocking position by dragging or moving the coupling members, when connecting two ends of a hose or the like together, over the ground or an obstruction in a direction to effect the movement of such locking part into its unlocking position, the opposite locking part will remain in its locking position and hold the coupling members locked together. A still further object of the invention is to so construct the locking means that the locking action takes effect as soon as the gaskets between the opposed ends of the coupling members reach their highest point of compression, and thus avoid the possibility of gaining a leaky joint between the parts by being required to first place the gaskets under compression greater than that required for final locking and allowing the gaskets to expand or recede to that extent.

The invention consists further in the matters hereinafter described and more particularly pointed out in the appended claims.

In the accompanying drawings—

Figure 1 is a side elevational view of a coupling with the two coöperating coupling members thereof locked together and constructed in accordance with my invention;

Fig. 2 is a like view of the same parts as shown in Fig. 1, with the exception that certain of the movable parts of the locking members are shown in the positions to which they are moved during the act of unlocking the coupling members;

Fig. 3 shows the coupling members unlocked and separated one from the other;

Fig. 4 is a side elevational view of the same parts shown in the preceding figures and illustrates the first position of the coupling members upon being brought together for locking;

Fig. 5 shows the next position of the coupling members in the act of locking the same;

Fig. 6 is a side elevational view of the coupling members locked together and in a little different position from that shown in Fig. 1;

Fig. 7 is a perspective view of the coupling members unlocked and separated endwise one from the other;

Fig. 8 is a transverse sectional view taken on line 8—8 of Fig. 1;

Fig. 9 is an enlarged longitudinal sectional view taken on line 9—9 of Fig. 8; and Fig. 10 is a transverse sectional view taken on line 10—10 of Fig. 9.

As shown in the drawings, the complete coupling embodying the features of my invention comprises two coöperating coupling members 10, 10, both made exactly alike so that one is a duplication of the other, and thus avoid the necessity of being required to use right and left, or male and female members for each complete coupling, and thereby making my improved coupling a universal one. From this it follows that either end of a hose or pipe, when equipped with one of the coupling members 10, may be readily and easily connected with either end of another hose or pipe provided with one of said coupling members 10. As clearly shown in Fig. 9, each member 10 comprises a tubular body portion of the required length and having at one end a head 11, preferably made cylindrical in shape and with a smooth outer surface, and a shank 12, to which the hose or pipe, as the case may be, is connected. In the example illustrated in the drawings, the head 11 is of a diameter slightly greater than that of the shank, and the latter has on its outer surface a plurality of annular ribs to aid in connecting a hose with the shank, but it will be of course understood that said shank may be made with either internal or external screw threads so that it may be readily connected with a metallic pipe or with a screw-threaded nipple or sleeve provided at the end of a flexible or other hose. This feature of the construction will of course depend upon the particular type of attaching means required to be used in each installation. When the coupling members 10, 10 are coupled together, the head portions 11, 11 abut endwise with rubber or like elastic gaskets 13, 13 therebetween. Each head portion 11 is provided at such end with a plurality of forwardly projecting locking members 14, 14, there being two in number on each coupling member 10 in the particular type of coupling shown in the drawings. Said locking members 14 may be integral or otherwise rigidly connected with or fixed to the associated head portions 11 and project forwardly therefrom the same distance and are made exactly alike. The locking members 14 on each coupling member 10 are diametrically disposed, as shown in the drawings, and are spaced apart circumferentially a distance slightly greater than the circumferential length of the locking members 14 on the opposite coupling member 10. In other words, while the locking members 14 on each coupling member 10 are made exactly alike, the circumferential length of each is such that the circumferential space between them is just large enough to receive therein the locking member 14 on the opposite coupling member 10, that is, one locking member 14 in each of such spaces. By this construction, it follows that the locking members 14 of one member 10 may be inserted into the space between the locking members 14 of the other member, as shown for instance in Figs. 1 to 5, inclusive. Each locking member 14 is provided in one of the end edges thereof with a notch 15, the latter forming at each side thereof two locking lugs 16, 17, respectively, the lug 16 being the outermost of the two as shown. The bottom of each notch is flat and parallel to the end edges of the associated locking member 14, while the outside edge 18 of the inner lug 17 is inclined or arranged at an angle to the base of the notch, as best shown in Figs. 1 to 5. The opposite side of the notch is straight or made at a right-angle to the base of the notch, as shown. The innermost side edge 19 of the outer lug 16 is also inclined at substantially the same angle as the edge 18 of the inner lug 17, while the outer side edge of said lug is straight or made at a right-angle to the base of the notch and is a continuation of that edge of the locking member 14. The locking members 14, 14 are extended bodily radially outward from the outer face of the head portion 11, as shown in Fig. 9, and thereby form rearwardly facing shoulders 20 at their inner ends. Slidably mounted in the head portion 11 is a locking member in the form of a sleeve 21, adapted to contact with the shoulders 20 for limiting the movement of the sleeves in that direction. Each sleeve 21 is provided with an internal recess 22, in which is located a spiral spring 23, the latter encircling the head portion 11 and bearing at one end against the sleeve and at the other end against a collar 24 fixed on the head portion 11, as clearly shown in said Fig. 9. Said portion 11 is also provided with an annular shoulder 25, against which the collar abuts. To prevent the sleeve 21 from turning about the portion 11, I provide in the outer surface of the latter a plurality of longitudinally extending grooves or key-ways 26, 26, there being two in number, as shown in Figs. 9 and 10, and into which fit and slide inwardly extending ribs or pins 27 provided on the sleeve for that purpose. Said grooves or key-ways 26, 26 extend through the shoulders 25 and the annular part of the body portion 11 immediately therebeyond. To hold each collar 24 from rotation, said collar is also provided with inwardly extending ribs or pins 28, 28 fitting in said grooves 26, as illustrated in Fig. 8. The sleeves 21, 21 are moved manually away from the locking members 14, 14 against the tension of the springs 23, 23, the latter serving to normally maintain said sleeves against such parts, as shown in Figs. 1, 4, 5, 7, and 9. Each sleeve 21 is provided in that edge thereof facing the locking member 14 with two outwardly opening slots or recesses 29, 29, one for each of the locking members 14 on the opposed coupling member 10 and of a length to receive them when the coupling members are locked together, as shown in Figs. 1 and 6. The opposed ends of the portions 11 are provided with suitable inwardly opening annular grooves 31 to receive and hold the rubber or like flexible gaskets 13, 13, heretofore mentioned, so as to form a fluid tight joint between the coupling members when the latter are locked together.

In Fig. 1, the two coupling members 10, 10 are shown locked together, and it is noted that the lugs 16, 17 on one locking member 14 interlock with the corresponding lugs on the associated locking member 14 of the opposite coupling member 10, and consequently said coupling members are prevented from being accidentally pulled or jarred apart endwise. At such time the sleeves 21 are held by their springs in their locking positions and the lock-members 14 are received in the recesses or slots 29 in the sleeves. Consequently, the coupling members are held against rotation relatively to each other, due to the fact that the ends of said grooves 29, 29 prevent it. Manifestly, should the coupling, when connecting two ends of a hose or pipe together, be dragged over the ground or an obstruction in a direction to slide one of the sleeves 21 from interlocking engagement with the associated locking members 14, 14, the other sleeve 21 would remain in its locking position and prevent the coupling members from being disconnected at such time. To unlock and separate the coupling members, the sleeves 21 of the two coupling members are grasped and slid away from the locking members 14 against the tension of the springs 23, so as to withdraw the slots 29 in the sleeves from engagement with the locking members 14, as shown in Fig. 2. At such time the locking members 14 still have their lugs 16, 17 in interlocking engagement with each other, and a straight pull on the coupling members at that time would effect the unlocking thereof, due to the fact that the inclined edges of the lugs act in the nature of a screw thread or spiral and serve to turn the coupling members so as to throw the lugs out of locking engagement. Thus, the coupling members 10, 10 become disengaged and may be separated endwise from each other, as shown in Figs. 3 and 7. To lock the two coupling members 10, 10 together, the same are brought endwise together with the locking members 14, 14 on one inserted into the spaces between the locking members 14, 14 on the other, as shown in Fig. 4. At such time the locking lugs 16, 17 are not in position to interlock with each other in case the coupling members are turned in the direction for that purpose. Then the coupling members are grasped about the shanks 12, 12 and are pushed or moved bodily toward each other. At such time the sleeves 21, 21 are slid away from the locking members 14 against the tension of the springs until the interlocking lugs 16, 17 are in position to interlock, as shown in Fig. 5, whereupon the coupling members are turned in opposite directions, so as to cause the lugs to interlock, as shown in Fig. 1. In thus bringing the coupling members into locking position, suitable force is required to gain that end, and the interposed gaskets 13, 13 are placed under compression by being forced against each other. When the gaskets are placed under the highest point of compression, the locking of the parts is effected, because as the coupling members are thus turned the sleeves 21 are carried therewith until the grooves or slots 29 therein reach positions to permit the locking members 14, 14 to be received within the same, and by reason of the springs 23 the sleeves are thereupon quickly snapped forward into their locking positions, as shown in Fig. 1, and lock the coupling members together, as is apparent. As the inclined edges of the lugs 16, 17 are brought together in the turning of the coupling members to effect the locking thereof, such edges act as inclined planes or screw threads and serve to further draw the coupling members together endwise and place additional pressure on the gaskets. The latter are so made that they necessarily project slightly beyond the opposed end faces of the coupling members 10, 10 when the latter are uncoupled. Thus, during the action of locking the coupling members 10, 10 together, the gaskets will be placed under compression and provide a fluid tight joint between the parts. The locking of the parts is effected as soon as the locking position is reached, and it follows that the gaskets are placed under no more compression than necessary to gain that end. In other words, said gaskets are not compressed beyond the amount necessary to effect the locking together of the parts, but are compressed just up to the locking point and no more and held compressed to that extent as long as the coupling members are locked together. This is brought about by the fact that the locking members become locked together just as soon as they reach their locking positions, and it is not a condition precedent to gain such end that the locking members be moved beyond their final locking position so as to reach the latter, as is made necessary in those types of couplings heretofore constructed where hooks are used and require the parts to be moved beyond their final locking positions so that the hooks may be made to engage. With such types of couplings it is apparent that the gaskets are placed under compression to a greater extent than required for final locking, the result being that the gaskets expand or recede back to final locking position, and when becoming less flexible by use the gaskets fail to expand and naturally provide a leaky joint between the parts. My novel form of coupling construction overcomes this objection, which is a serious one as it renders the coupling leaky, which is especially detrimental when used for coupling that type of hose or pipe employed for conveying compressed air to pneumatic tools and the like. Other and further advantages of my invention will be apparent to those skilled in the art to which my invention appertains.

While I have shown and described herein in detail one form of coupling device embodying the features of my invention, it is of course understood that the several details of construction and arrangement of parts shown may be variously changed and modified without departing from the spirit and scope of my invention, and I do not wish to be limited to the details of construction except as pointed out in the appended claims.

I claim as my invention:

1. A coupling, comprising two coöperating coupling members, each having a tubular body portion provided with a plurality of fixed locking members adapted to interlock with the fixed locking members on the body portion of the opposed coupling member for holding said coupling members from being moved apart endwise, and each coupling member being provided with means non-rotatably connected with the body portion thereof and adapted to interlock with the fixed locking members on the body portion of the opposed coupling member for holding the coupling members against relative rotation.

2. A coupling, comprising two coöperating coupling members, each having a tubular body portion provided with a plurality of fixed locking members adapted to interlock with the fixed locking members on the body portion of the opposed coupling member for holding said coupling members from being moved apart endwise, and means slidably and non-rotatably connected with the body portion of each coupling member and adapted to interlock with the fixed locking members on the body portion of the opposed coupling member for holding the coupling members against relative rotation.

3. A coupling, comprising two coöperating coupling members, each having a tubular body portion provided with a plurality of fixed locking members adapted to interlock with the fixed locking members on the body portion of the opposed coupling member for holding said coupling members from being moved apart endwise, and a spring pressed sleeve slidably and non-rotatably connected with the body portion of each coupling member and adapted to interlock with the fixed locking members on the body portion of the opposed coupling member for holding the coupling members against relative rotation.

4. A coupling, comprising two coöperating coupling members, each having a tubular body portion provided with a plurality of fixed locking members having lugs adapted to interlock with the lugs of the fixed locking members on the body portion of the opposed coupling member, and a spring pressed sleeve slidably and non-rotatably connected with the body portion of each coupling member and provided with recesses adapted to receive the fixed locking members on the body portion of the opposed coupling member.

5. A coupling, comprising two coöperating coupling members, each having a tubular body portion provided with a plurality of fixed locking members having lugs adapted to interlock with the lugs of the fixed locking members on the body portion of the opposed coupling member, a spring pressed sleeve slidably mounted on the body portion of each coupling member and having recesses adapted to receive the fixed locking members on the body portion of the opposed coupling member, and each body portion having a groove extending longitudinally thereof beneath said sleeve to receive a rigid pin on the sleeve for holding the latter against rotation.

6. A coupling, comprising two coöperating coupling members, each having a tubular body portion provided with a plurality of fixed locking members having lugs at the sides thereof and adapted to interlock with the lugs of the fixed locking members on the body portion of the opposed coupling member, said lugs being provided with coacting inclined edges serving to draw the body portions of said coupling members together, and a spring pressed sleeve slidably and non-rotatably connected with the body portion of each coupling member and adapted to interlock with the fixed locking members on the body portion of the opposed coupling member.

7. A coupling, comprising two coöperating coupling members, each having a tubular body portion provided with a plurality of fixed locking members projecting beyond one end of said body portion and adapted to interlock with the fixed locking members on the body portion of the opposed coupling member for holding the coupling members from being moved apart endwise, and a spring pressed sleeve slidably and non-rotatably connected with the body portion of each coupling member to the rear of the fixed locking members thereon and adapted to interlock with the fixed locking members on the body portion of the opposed coupling member for holding the coupling members against relative rotation.

8. A coupling, comprising two coöperating coupling members, each having a tubular body portion provided with a plurality of fixed locking members projecting beyond one end of said body portion and provided with lugs at the sides thereof and adapted to interlock with the lugs of the fixed locking members on the opposed coupling member, and a spring pressed sleeve slidably and non-rotatably connected with the body portion of each coupling member to the rear of the fixed locking members thereon and provided with recesses to receive the fixed locking members on the body portion of the opposed coupling member.

9. A coupling, comprising two coöperating coupling members, each having a tubular body portion provided with a plurality of fixed locking members adapted to interlock with the fixed locking members on the body portion of the opposed coupling member for holding said coupling members from being moved apart endwise, and each coupling member being provided with means non-rotatably connected with the body portion of said coupling member and adapted to automatically interlock with the fixed locking members on the body portion of the opposed coupling member for holding the coupling members against relative rotation as soon as the fixed locking members become interlocked.

In testimony that I claim the foregoing as my invention, I affix my signature in the presence of two witnesses, this 8th day of May, A. D. 1918.

JOHN T. NELSON.

Witnesses:
JOHN B. FREEMAN,
AXEL LEVEDA.